(12) United States Patent
Kim et al.

(10) Patent No.: US 6,466,197 B1
(45) Date of Patent: Oct. 15, 2002

(54) METHOD AND APPARATUS FOR DRIVING POINTING DEVICE OF COMPUTER SYSTEM

(75) Inventors: Young-Jun Kim, Seoul; Seong-Dong Kim, Kyunggi-do, both of (KR)

(73) Assignee: Samsung Electronics Co., Ltd., Suwon City (KR)

( * ) Notice: Subject to any disclaimer, the term of this patent is extended or adjusted under 35 U.S.C. 154(b) by 0 days.

(21) Appl. No.: 09/342,829

(22) Filed: Jun. 28, 1999

(30) Foreign Application Priority Data

Jun. 27, 1998 (KR) .......................................... 98-24513

(51) Int. Cl.7 ................................................ G09G 5/00
(52) U.S. Cl. ...................... 345/156; 345/856; 345/857; 345/858; 345/859; 345/860; 345/861; 345/862
(58) Field of Search .......................... 375/237; 345/145, 345/856–862

(56) References Cited

U.S. PATENT DOCUMENTS

| | | | |
|---|---|---|---|
| 4,586,035 A | * 4/1986 | Baker et al. ............ | 178/18.01 |
| 4,672,154 A | 6/1987 | Rodgers et al. | |
| 5,010,323 A | 4/1991 | Hoffman | |
| 5,231,698 A | 7/1993 | Forcier | |
| 5,325,398 A | * 6/1994 | Murakami ................ | 375/237 |
| 5,347,295 A | 9/1994 | Agulnick et al. | |
| 5,534,893 A | 7/1996 | Hansen, Jr. et al. | |
| 5,557,301 A | 9/1996 | D'Aviau de Piolant | |
| 5,798,760 A | * 8/1998 | Vayda et al. ............ | 345/834 |
| 6,078,308 A | * 6/2000 | Rosenberg et al. ...... | 345/163 |

* cited by examiner

Primary Examiner—Steven Saras
Assistant Examiner—Christopher J. Maier
(74) Attorney, Agent, or Firm—Robert E. Bushnell, Esq.

(57) ABSTRACT

A method for driving a pointing device of a computer system is provided. In the method, a pointer is positioned in a user interface area for performing a specific command such as an icon, a menu bar, and a menu button. If the pointer is moved from the user interface area to a specific area over a predetermined distance, an amount of the position change of the pointer is detected and if the amount thereof corresponds to a button click of the pointing device, the same pointing signal as that of a corresponding button click is generated. It is therefore possible to perform the same function as a button click when the pointer is moved in a specific direction over a predetermined distance without using a button of the pointing device. Thus, a user is able to more conveniently use the pointing device, and changing a holding form while clicking the button of the stylus can be advantageously reduced or suppressed.

23 Claims, 6 Drawing Sheets

METHOD AND APPARATUS FOR DRIVING POINTING DEVICE OF COMPUTER SYSTEM

CLAIM OF PRIORITY

This application makes reference to, incorporates the same herein, and claims all benefits accruing under 35 U.S.C. §119 and §120 from an application entitled METHOD FOR DRIVING POINTING DEVICE OF COMPUTER SYSTEM earlier filed in the Korean Industrial Property Office on Jun. 27, 1998, and there duly assigned Serial No. 98-24513.

FIELD OF THE INVENTION

The present invention relates to a method for driving a pointing device of a computer system with the pointing device such as a digitizer and a touch pad.

BACKGROUND OF THE INVENTION

A digitizer is used in a computer aided design (CAD) system or a graphic display computer system for drawing a picture, a chart, a plan, etc. Also, a computer system exemplary of contemporary practice in the art includes a body, a monitor, a keyboard, a tablet, and a stylus. The computer system can additionally include a printer, a plotter, a joystick, a light pen, etc.

A digitizer is a kind of an input device of the computer system, and includes a tablet and a stylus. The tablet is a rectangular plane type, and the pen-type stylus allows a user to move the user's hand therewith on the tablet. Fine wires are spread under the X and Y coordinate input surface of the tablet. The tablet is an input device which can convert X and Y coordinate axes into the binary data of a computer by using the change of an electromagnetic field resulting from a moving object thereon. When a user moves the stylus on the tablet, a bottom board reads the coordinate, which is then transmitted to a screen memory area. At this time, when the user presses a tip of the stylus or buttons on the stylus, the command can be performed. A spring is located in the stylus. Thus, pressed on the bottom board, the tip can be inserted into the stylus.

The tip and the buttons of the stylus can serve as a mouse button. The user can set up the functions thereof by using software. For example, a tip, a first button, and a, second button can be respectively served as a left button click, a left button double click, and a right button click. Thus, when the user puts the stylus on the top surface of the tablet and presses the tip or the buttons of the stylus, the corresponding function is performed.

Since the buttons are positioned at a body portion of a slim and long stylus, the user should hold the stylus taking into consideration the position the buttons of the stylus. Further, the round pen-type stylus can change its direction while using it. Accordingly, the user can continuously change a holding form while using the stylus.

U.S. Pat. No. 4,672,154 to Rodgers, et al. entitled Low Power, High Resolution Digitizing System With Cordless Pen/Mouse, disclose a cordless pen that emits a directional electric field from the tip of a conductive pen cartridge. The pen tip is capacitively coupled to embedded major X and major Y conductors in a digitizer tablet, which are scanned to determine which three X conductors and which three Y conductors have the greatest resulting signal levels. It is disclosed a microprocessor calculates the precise pen location from the three largest X signals and the three largest Y signals. A resistive path to ground is provided for each X and Y conductor. A plurality of minor conductors are disposed between each pair of X and Y conductors. A resistive divider circuit linearly distributes the voltage across the pair of conductors among the minor conductors therebetween, and improves the capacitively coupled signal levels and also "localizes" noise signals. The frequency of the pen signal is modulated by several pen switches. It is disclosed circuitry in the digitizing tablet discriminates the pen frequency to decode the commands represented by switch closures between data scanning operations.

U.S. Pat. No. 5,010,323 to Hoffman entitled Interactive Overlay Driven Computer Display System, discloses an overlay driven display system incorporating a digitizer tablet and a stylus for providing coordinate signals to a computer which signals are representative of the coordinates of any point on the tablet selected by the position of the stylus on the tablet. The computer is coupled to a display device, such as a CRT, for displaying addressed data, such as graphic information. It is disclosed an overlay, randomly positionable on the digitizer tablet, contains areas relating to the position of tablet coordinate signals that correspond to the addresses of the data stored in the computer. Three triangularly positioned points on the overlay identify a unique triangle which relates the overlay to the unique angular relationship of the computer file. It is disclosed software is provided for translating the overlay points to the coordinate system of the digitizer tablet and for scaling the points to match the coordinate system of the digitizer tablet such that the file corresponding to the overlay is accessed and areas on the overlay, when selected by the angular relationship of the points on the stylus, are displayed on the CRT.

U.S. Pat. No. 5,231,698 to Forcier entitled Script/Binary-Encoded-Character Processing Method And System, discloses a pen-based computer that implements enable input, editing and other manipulation of handwritten script, ASCII text and drawings in a common document using a compatible internal representation of the data and a simple, consistent set of user control functions. These functions it is disclosed are invoked by the user with an intuitive and interactive set of user gestures which do not distract the user from the task of inputting or editing the document. A twostep gesture method it is disclosed avoids confusion between strokes and command gestures and allows similar gestures to be used for different functions within the same and different contexts.

U.S. Pat. No. 5,347,295 to Agulnick, et al. entitled Control Of A Computer Through A Position-Sensed Stylus, disclose a notebook computer which is controlled by a stylus executing gestures on the computer screen. It is disclosed the stylus and the computer include complementary electronic circuitry by which the proximity of the stylus tip to the computer is sensed. The proximity sensing is used to detect to approach of the stylus tip to the computer screen, and gestural commands are then entered on the screen by moving the stylus. The entry of a command is terminated by removing the stylus tip from proximity with the screen, which is detected by the computer, which then implements the command. Alternative methods of implementing the commands it is disclosed include time-outs and command termination buttons.

U.S. Pat. No. 5,534,893 to Hansen, et al. entitled Method And Apparatus For Using Stylus-Tablet Input In a Computer System, disclose a stylus-aware computer system and method for processing information obtained by moving a stylus over a tablet of the type that displays images as well as inputs stylus information. It is disclosed as a user moves the stylus with respect to the tablet, the tablet generates outputs describing the position of the stylus with respect to the tablet. A tablet driver converts this data into standardized packet objects recognized by the computer system and sends the packet objects to a stroke manager. It is disclosed the stroke manager converts the package objects to stroke objects which represent the trajectory of the stylus with respect to the tablet at times between two transitions such as placing the stylus on the tablet and lifting the stylus off the tablet. The stroke manager notifies an application of the stroke object through an event queue. It is disclosed the application can then issue stroke commands which dictate how the stroke is used.

U.S. Pat. No. 5,557,301 to D'Aviau de Piolant entitled Graphic Drawing System, discloses a graphic drawing system that includes a drawing surface and a stylus capable of being moved over the surface in order to simulate plotted lines. It is disclosed the coordinates of the stylus in the plane of the surface are determined with respect to a reference, and a digital image can be created or updated using these coordinates. This digital image can be displayed on screen. It is disclosed an angle of the stylus with respect to the drawing surface can determine a line width in the image.

SUMMARY OF THE INVENTION

The present invention has as an objective providing a method for driving a pointing device of a computer system capable of performing the same function as a button click by moving a pointer to a specific direction without clicking a button of the pointing device.

To achieve the above and other objectives of the present invention, there is provided a method for driving a pointing device of a computer system. In the method, a pointer is moved so as to be demonstrated on a screen of a display device according to pointer data received from the pointing device. It is judged whether the pointer is positioned in a user interface area. It is also judged whether the position of the pointer is changed, if the pointer is positioned in a user interface area. If the position of the pointer is changed, an amount of the position change of the pointer is detected. It is judged whether the amount thereof corresponds to a button click of the pointing device. Finally, if the amount thereof corresponding to the button click of the pointing device, a same signal that a corresponds button click generates is generated.

In a method and apparatus for driving a pointing device of a computer system according to the present invention, a pointer is positioned in a user interface area, as an initial reference position, wherein a specific command such as an icon, a menu bar, and a menu button is performed. When the pointer is moved from the area in a specific direction over a predetermined distance, a quantity of the position that the pointer is moved is detected. When the quantity corresponds to a button click of the pointing device, the same pointing signal as that of the corresponding button click is generated. It is therefore possible to perform the same function as a button click by moving the pointer in the specific direction over the predetermined distance without using the button of the pointing device. That is, users can conveniently use the pointing device.

Also, in the present invention, a change in a holding form resulting from a click of a button of a stylus used in a pointing device such as a digitizer can be advantageously suppressed.

According to a preferred embodiment of the present invention, the amount of the position change of the pointer is dependent upon the moving distance and direction of the pointer.

According to the present invention, the pointing device desirably includes a tablet of a two-dimensional coordinate plane and a stylus which is operated on the tablet and indicates the position of the pointer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein.

DETAILED DESCRIPTION OF PREFERRED EMBODIMENTS

Now referring to the drawings, the preferred embodiments of this invention are hereinafter described.

Figure 1:
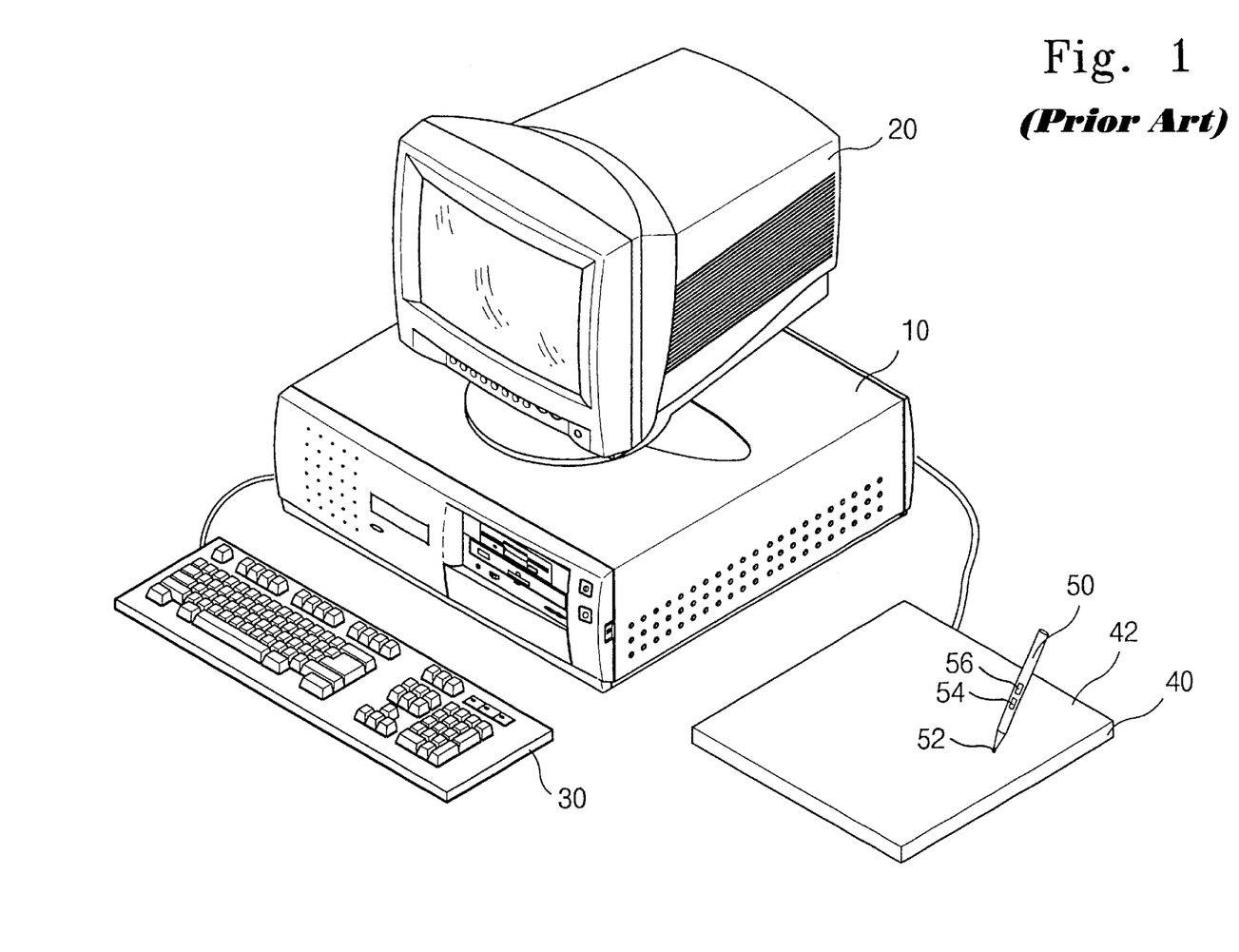
FIG. 1 is a drawing showing a digitizer connected to a computer system exemplary of contemporary practice in the art.

FIG. 1 illustrates a digitizer connected to a computer system exemplary of contemporary practice in the art. Referring to FIG. 1, the computer system includes a computer body 10, a monitor 20, a keyboard 30, a tablet 40, and a stylus 50. Although not shown, the computer system can additionally include a printer, a plotter, a joystick, a light pen, etc.

A digitizer is a kind of an input device of the computer system, and includes tablet 40 and stylus 50. The tablet 40 is a rectangular plane type, and the pen-type stylus 50 allows a user to move the user's hand therewith on the tablet 40. The fine wires are spread under the X and Y coordinate input surface 42 of tablet 40. The tablet 40 is an input device which can convert X and Y coordinate axes into the binary data of a computer by using the change of an electromagnetic field resulting from a moving object thereon. When a user moves the stylus 50, a bottom board of tablet 40 reads the coordinate, which is then transmitted to a screen memory area. At this time, when the user presses a tip 52 or buttons 54 and 56 of stylus 50, the command can be performed. A spring is located in the stylus 50. Thus, pressed on the bottom board, the tip 52 can be inserted into the stylus 50.

The tip 52 and the bottons 54 and 56 of stylus 50 can serve as a mouse button. The user can set up the functions thereof by using software. For example, a tip 52, a first button 54, and a second button 56 of stylus 50 can respectively serve as a left button click, a left button double click, and a right button click. When the user puts the stylus 50 on the top surface 42 of tablet 40 and presses the tip 52 or the buttons 54 and 56, the function is performed.

Since the buttons 54 and 56 of stylus 50 are positioned at a body portion of a slim and long stylus, the user should hold the stylus 50 taking into consideration the position of the buttons 54 and 56. Further, the round pen-type stylus 50 can change its direction while using it. Accordingly, the user should continuously change a holding form while using the stylus 50.

Figure 2:
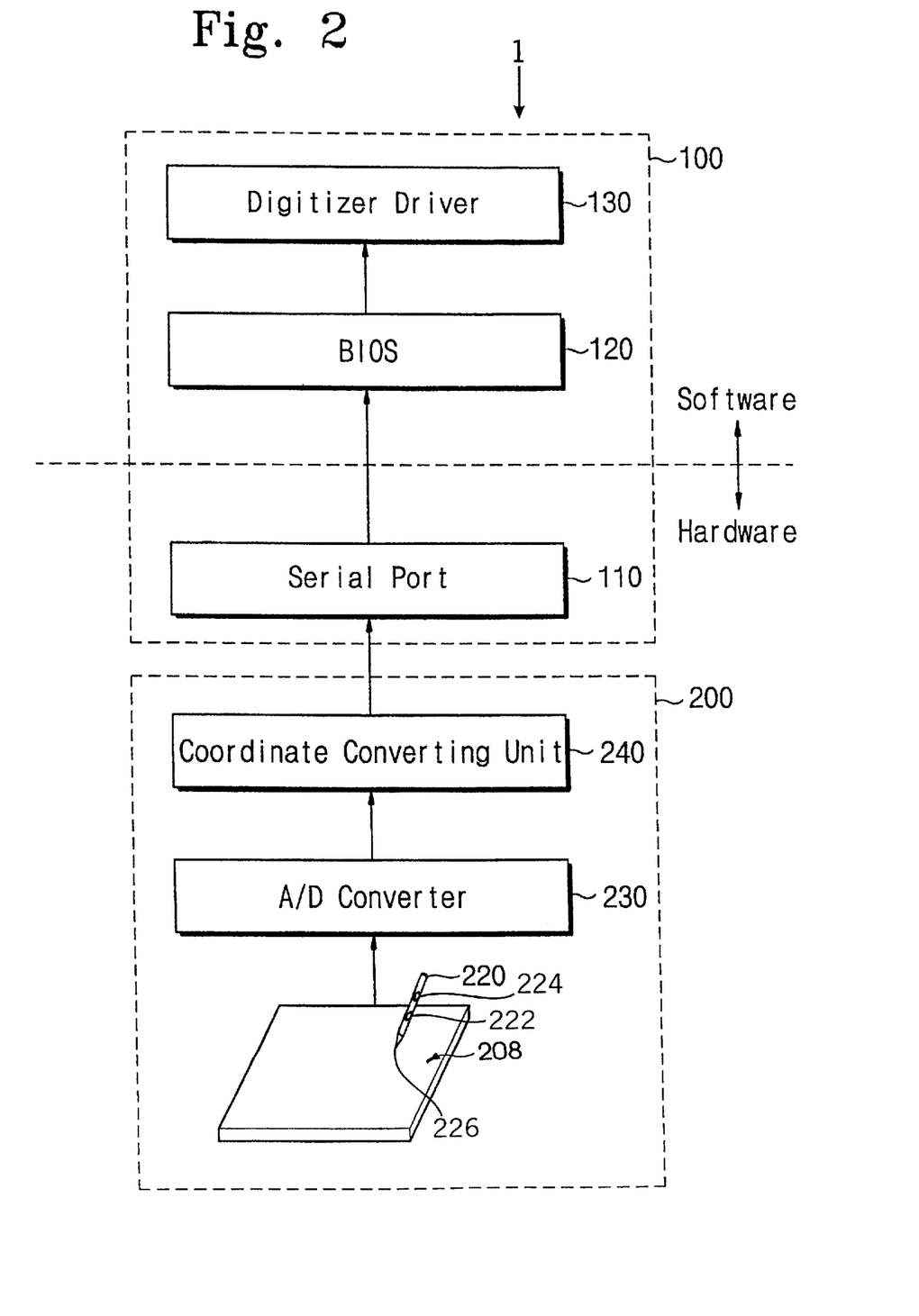
FIG. 2 is a block diagram showing the composition of a computer system and a digitizer according to the present invention.

FIG. 2 illustrates an embodiment of a computer system 1 and a digitizer 200 of computer system 1 according to the present invention. Referring now to FIG. 2, a computer system 1 including a computer body 100 and a digitizer 200 is illustrated. Computer system 1 also includes a processor, such as a microprocessor or a central processing unit (CPU), for controlling operation of the computer system 1, and a memory communicating with the processor for storing programs and data, including programs and data related to the movement of the pointer and pointing device. Digitizer 200 includes an analog/digital converter (A/D converter) 230 and a coordinate converting unit 240. The A/D converter 230 receives and converts an analog change of an electromagnetic field under an X and Y coordinate input surface 208 of tablet 210 according to the movement of a stylus 220 and, thereafter, converts the analog change thereof into a digital signal. The stylus 220 of FIG. 2, similar to the stylus 50 of FIG. 1, can have a first button 222, a second button 224 and a tip 226, that function similarly to the first button 54, the second button 56 and the tip 52 of stylus 50. The data converting unit or coordinate converting unit 240, such as a processor or a microprocessor, for example, converts the digital signal received from the analog/digital converter (A/D converter) 230 into the X and Y coordinate values and, thereafter, generates the X and Y coordinate values. The X and Y coordinate values are binary data which are proper to and compatible with a computer system.

The coordinate converting unit 240, communicates with the memory of the computer system 1, or can include a memory, for storing data, such as data related to movement of the pointer and the pointing device.

A computer body 100 for driving the digitizer 200 includes a serial port 110, a basic input output system (BIOS) 120, and a digitizer driver 130. The X and Y coordinate values generated from the coordinate converting unit 240 of the digitizer 200 are received from the serial port 110 of the computer body 100. The serial port 110, which is an input/output port, transmits to and receives data from peripheral devices (for example, a plotter, a mouse, a modem, a tablet, etc.). The basic input output system (BIOS) 120 includes routines for driving input/out devices (for example, a display device, a keyboard, a serial communication port, a printer, a floppy disk, etc.). The basic input output system (BIOS) 120 probes whether the X and Y values are received from the serial port 110 or not, such as received from coordinate converting unit 240, so that the values from the serial port 110 are supplied to the digitizer driver 130. The digitizer driver 130, such as a processor or a microprocessor, allows a pointer to be moved along according to the received X and Y coordinate values. The operation of the digitizer driver 130 will be described in detail with reference to FIGS. 3A–3C and FIG. 4, the digitizer driver 130 communicating with the memory of the computer system 1 or includes a memory.

Figure 3A:
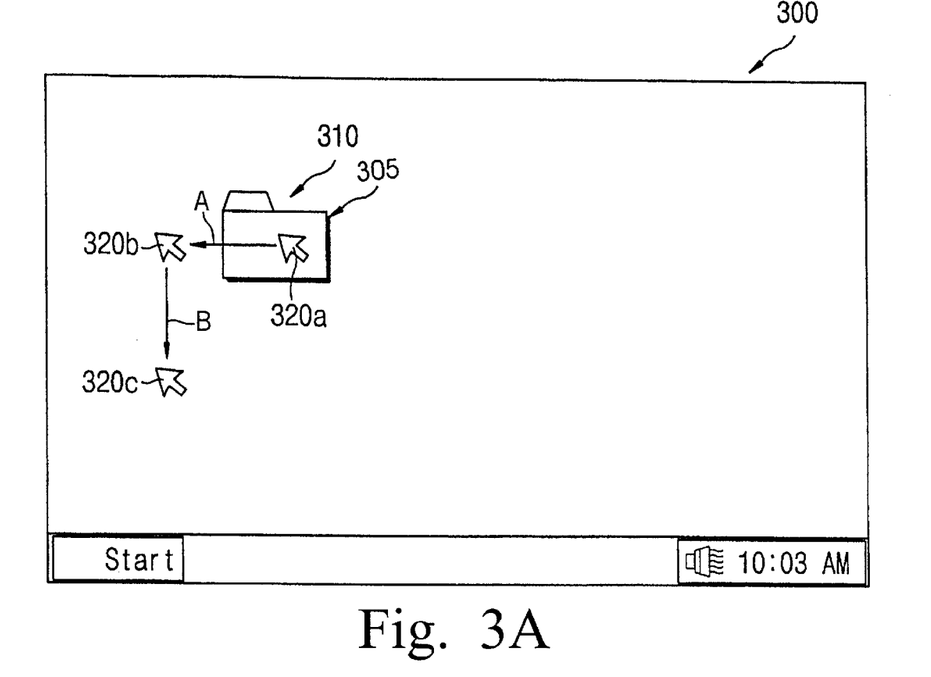
FIGS. 3A–3C are exemplary drawings respectively showing the same function as a button click, button clicks or pressing a tip of a stylus without clicking a button or pressing a tip of a stylus by using a digitizer according to the present invention.
Figure 3B:
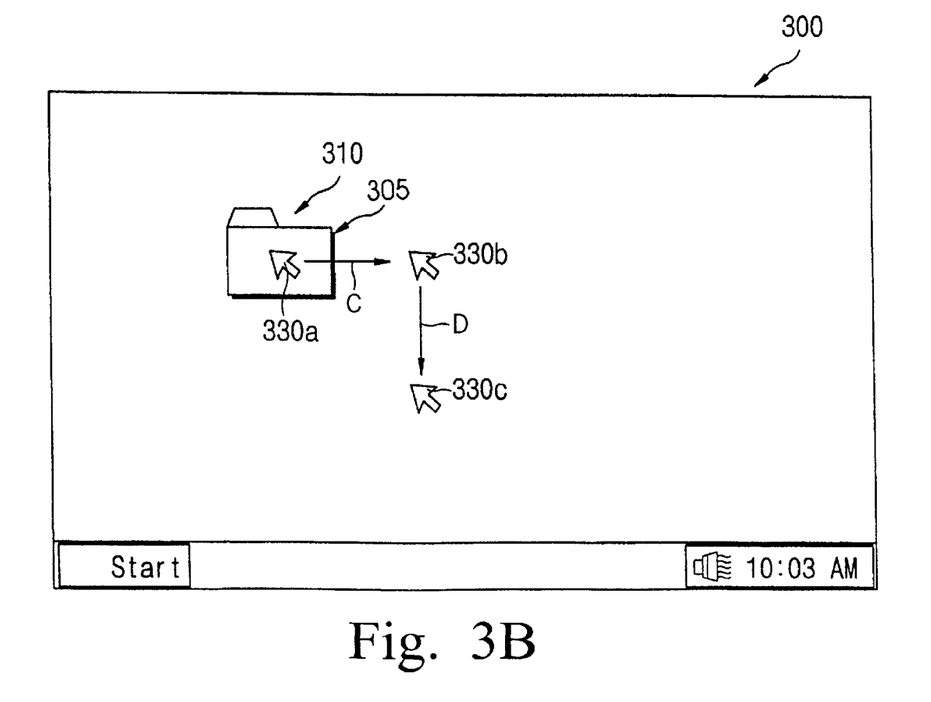
Figure 3C:
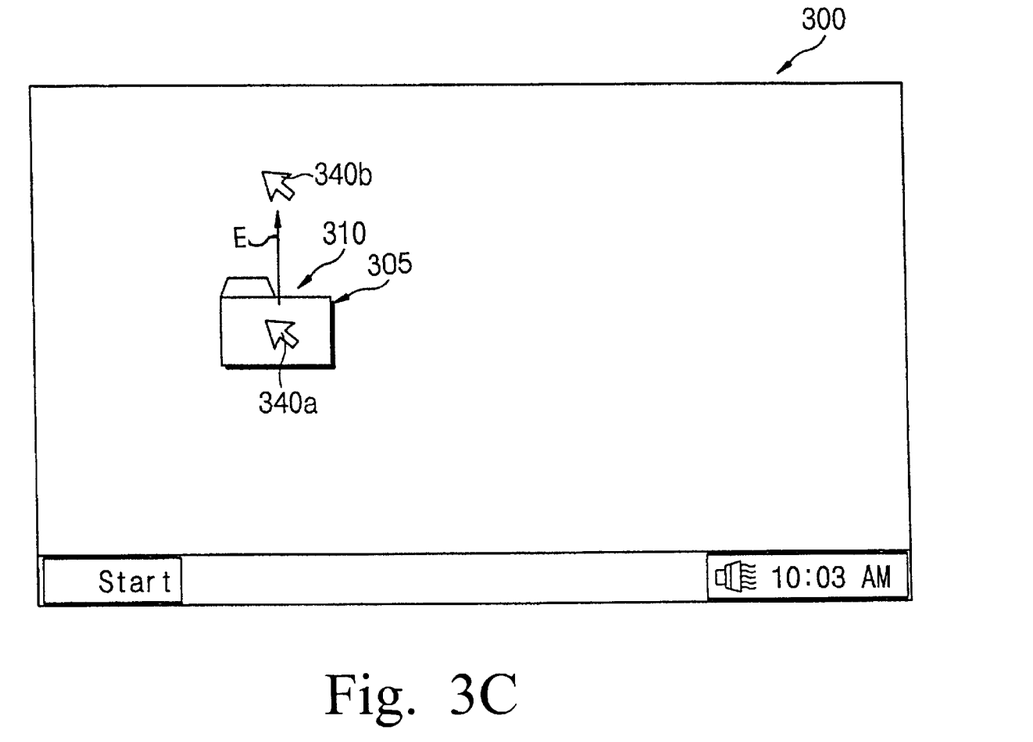

FIGS. 3A–3C illustrates the same function as a button click without clicking a button or without pressing a tip of a stylus by using a digitizer 200 according to the present invention. Referring now to FIG. 2 and 3A–3C, an example of the screen 300 which can be displayed in a predetermined area of a monitor or display device for the computer system 1 is the "Windows 95" background screen of the Microsoft Co, for example. "Windows 95" is an operating system (OS) administering a hardware or an application program of a computer. An icon 310 is shown in FIGS. 3A–3C. The icon 310 is a small drawing or a symbol that is displayed on the screen 300 as a user interface area 305, so as to specify a variety of programs, command languages, and data files, for example. Clicking the icon 310 causes an operation or a series of operations to be performed by the computer system 1.

FIG. 3A illustrates an example of how a coordinate of a pointer 320*a*–320*c* is moved to perform the same operation as a first button click of a stylus 220 of FIG. 2 or stylus 50 of FIG. 1. An arrow-type pointer 320*a*–320*c* in FIG. 3A is a cursor showing the position wherein letters, numerals or characters will be received or generated. In this regard, the pointer 320*a*–320*c* is moved along the direction that the stylus 220 is moved on the X and Y coordinate input surface 208 of the tablet 210. The operation for performing the same function as the first button click of the stylus 220 will now be described.

Continuing with reference to FIGS. 2 and 3A, a pointer (320*a*) is positioned on the icon 310 (320*a*) as a user interface area 305 by positioning of the stylus 220 on the X and Y coordinate input surface 208 of tablet 210 (FIG. 2). The pointer (320*b*) is then moved to the left out the icon 310 (320*b*) as illustrated by the arrowed line A, and then the pointer is moved thereunder (320*c*) as illustrated by the arrowed line B, by movement of the stylus 220 on the X and Y coordinate input surface 208 of tablet 210. The digitizer driver 130 recognizes the coordinate change of the pointer (320*a*–320*c*), so that a control signal is generated to perform the same function as the first button click of the stylus 220 by the operating system (OS). Although performed in the screen 300, the foregoing steps are actually displayed by moving the graphic cursor to the position that a user moves the stylus 220 on the X and Y coordinate input surface 208 of the tablet 210, with the screen 300 illustrating the positioning and the movement of stylus 220. The click or a double-click of the first button 222 of the stylus 220 is the same function as the double click of the left of a mouse. The click of the first button 222 is the command of performing a program corresponding to the position or loading a file of the position, for example.

Referring now to FIG. 2 and 3B, FIG. 3B illustrates an example of performing the same function as a second button click of a stylus 220 by moving the coordinate of a pointer. Referring to FIG. 3B, it will be described to perform the same function as a second button click of a stylus 220 so that the icon 310 can be selected by a user. In FIG. 3B, the pointer (330*a*) is positioned on the icon 310 (330*a*) as a user interface area 305 by positioning of the stylus 220 on the X and Y coordinate input 208 of tablet 210 (FIG. 2). Then, the pointer (330*b*) is then moved to the right outside the icon 310 (330*b*) as illustrated by the arrowed line C, and the pointer (330*c*) is then moved thereunder (330*c*) as illustrated by the arrowed line D, by movement of the stylus 220 on the X and Y coordinate input surface 208 of tablet 210. Recognizing the coordinate change of the pointer (330*a*–330*c*), the digitizer driver 130 makes the operation system (OS) perform the same function as the second button click of the stylus 220. The second button 224 performs the same function (for example, displaying menus according to the situation, special drag operation, etc.) as the right button of a mouse.

Referring now to FIGS. 2 and 3C, FIG. 3C illustrates an example of performing the same function as pressing the tip 226 of stylus 220 or as a single click of a respective; first or second button 222, 224 of stylus 220 by moving the coordinate of a pointer (340a, 340b). Referring to FIG. 3C, it will be described as an example to perform the same function as a left button click of a mouse, such as by the function performed by pressing a tip 226 of stylus 220 or a single button click of a respective first or second button of stylus 220 so that the icon 310 can selected by a user. In FIG. 3C the pointer (340a) is positioned on the icon 310 (340a) as a user interface area 305, by positioning of the stylus 220 on the X and Y coordinate input surface 208 of tablet 210 (FIG. 2). The pointer (340b) is then moved above the icon 310 (340b), as illustrated by the arrowed line E, by movement of the stylus 220 on the X and Y coordinate input surface 208 of tablet 210. Recognizing the coordinate change of pointer (340a–340b), the digitizer driver 130 makes operation system (OS) perform the same function as a single left button click of a mouse, such as a corresponding function performed by pressing the tip of the stylus 220 on the X and Y coordinate input surface 208 of tablet 210 or the corresponding single click of a respective first or second button of stylus 220. The pressing of the tip of the stylus 220 on the X and Y coordinate input surface 208 or the pressing of the corresponding first or second button of stylus 220 performs the same function as a left button click of a mouse.

In a preferred embodiment of the present invention, the icon 310 is described as an example of the user interface. However, it is possible to use every software implemented as a graphical user interface (GUI), for example.

Figure 4:
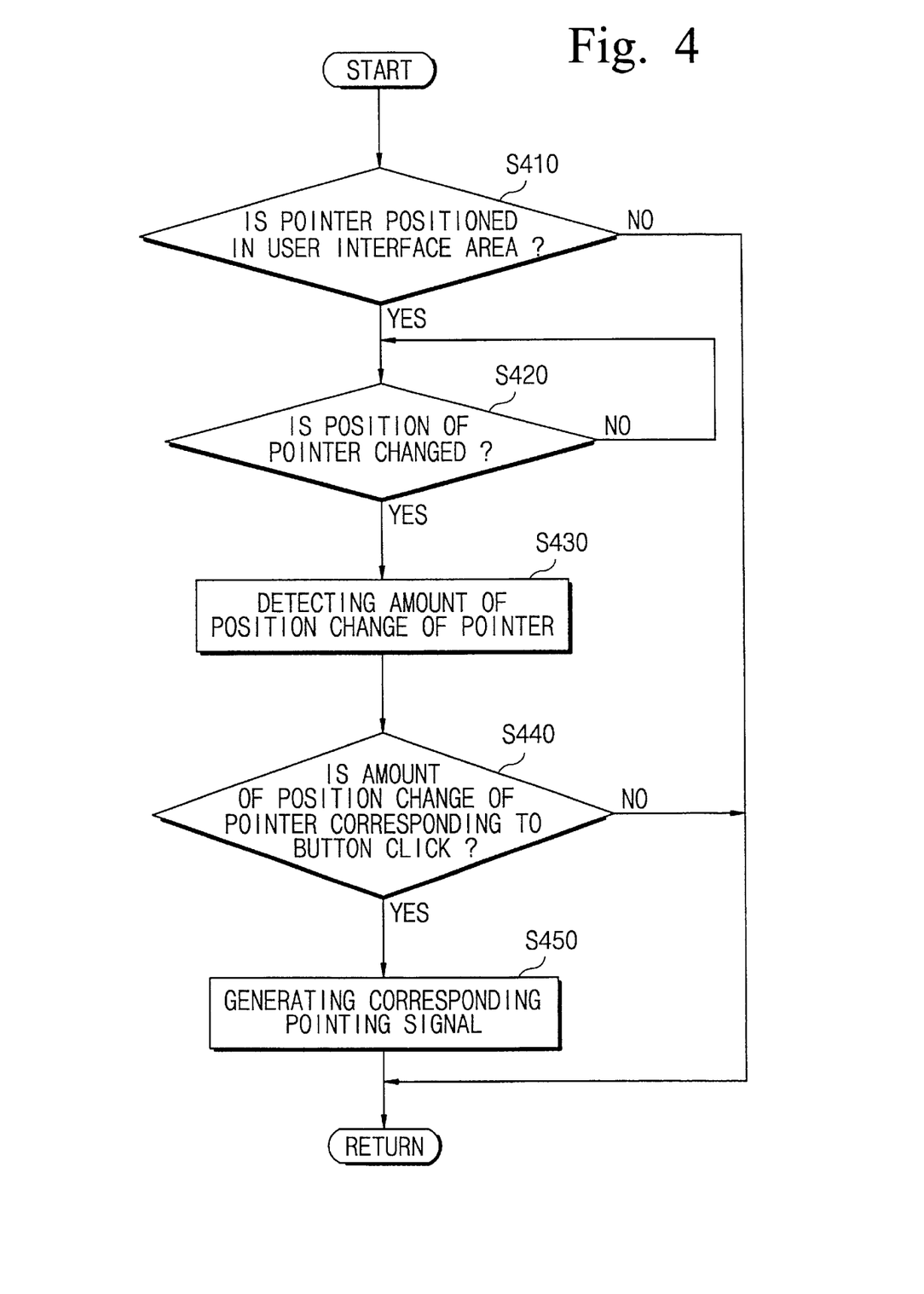
FIG. 4 is a flow chart showing the control steps of a computer system with a digitizer according to the present invention.

FIG. 4 illustrates the control steps of a computer system in a method for driving a pointing device of a computer system 1 with a digitizer 200 according to the present invention.

Referring now to FIG. 2 through FIG. 4, particularly FIG. 4, in step S410, it is judged whether the pointer is positioned in the user interface area 305 or not. If the pointer (320a, 330a, 340a) is positioned in the user interface area 305, step S410 proceeds to step S420 to judge whether the movement of the pointer (320b, 320c; 330b, 330c; 340b) corresponds to a button click. In step S420, it is determined whether a two-dimensional (X, Y) coordinate value is received from the tablet 210 through digitizer 200 to the digitizer driver 130, and then it is determined if the position of the pointer is changed or not. If the position of the pointer is changed, step S420 proceeds to the next step S430. If the position of the pointer is not changed, step S420 is returned and waits at step S420.

In step S430 of FIG. 4, an amount of the position change of the pointer is detected. The amount of the position change of the pointer is determined by the two-dimensional (X, Y) coordinate value supplied from the tablet 210 through digitizer 200 to the digitizer driver 130. The amount of the position change of the pointer is dependent upon the moving distance and direction of the pointer. The process then proceeds to step S440.

In step S440 of FIG. 4, it is determined whether the amount of the position change of the pointer corresponds to the button click or to a pressing of the tip of the stylus 220. An amount of the reference position change which is the basis of this determination is fundamentally supplied or preset by the user in the computer system 1, for example. If the movement of the pointer corresponds to the button click or a pressing of a tip of the stylus 220, step S440 proceeds to step 450. If the amount of the position change of the pointer does not so correspond in step S440, the controlling operation is finished and proceeds to return.

In step S450 of FIG. 4, the digitizer 130 generates the same pointing signal as the corresponding button click or a pressing of the tip of stylus 220 that corresponds to the amount of the position change of the pointer. The operating system (OS) or the applying program then performs the function according to the input of the pointing signal.

As mentioned above, when a pointer is positioned in the user interface area (for example, an icon, a menu bar, a menu button, etc.) for performing a specific command and is moved in a specific direction which is preset by a user over a predetermined distance, a computer system 1 with a digitizer 200 according to a preferred embodiment of the present invention can generate the same pointing signal as the corresponding button click or as a pressing of the tip of a stylus. Thus, it is possible to perform the same function as the corresponding button click or pressing of the tip of the stylus without using a button or pressing of the tip of a stylus.

Figure 5:
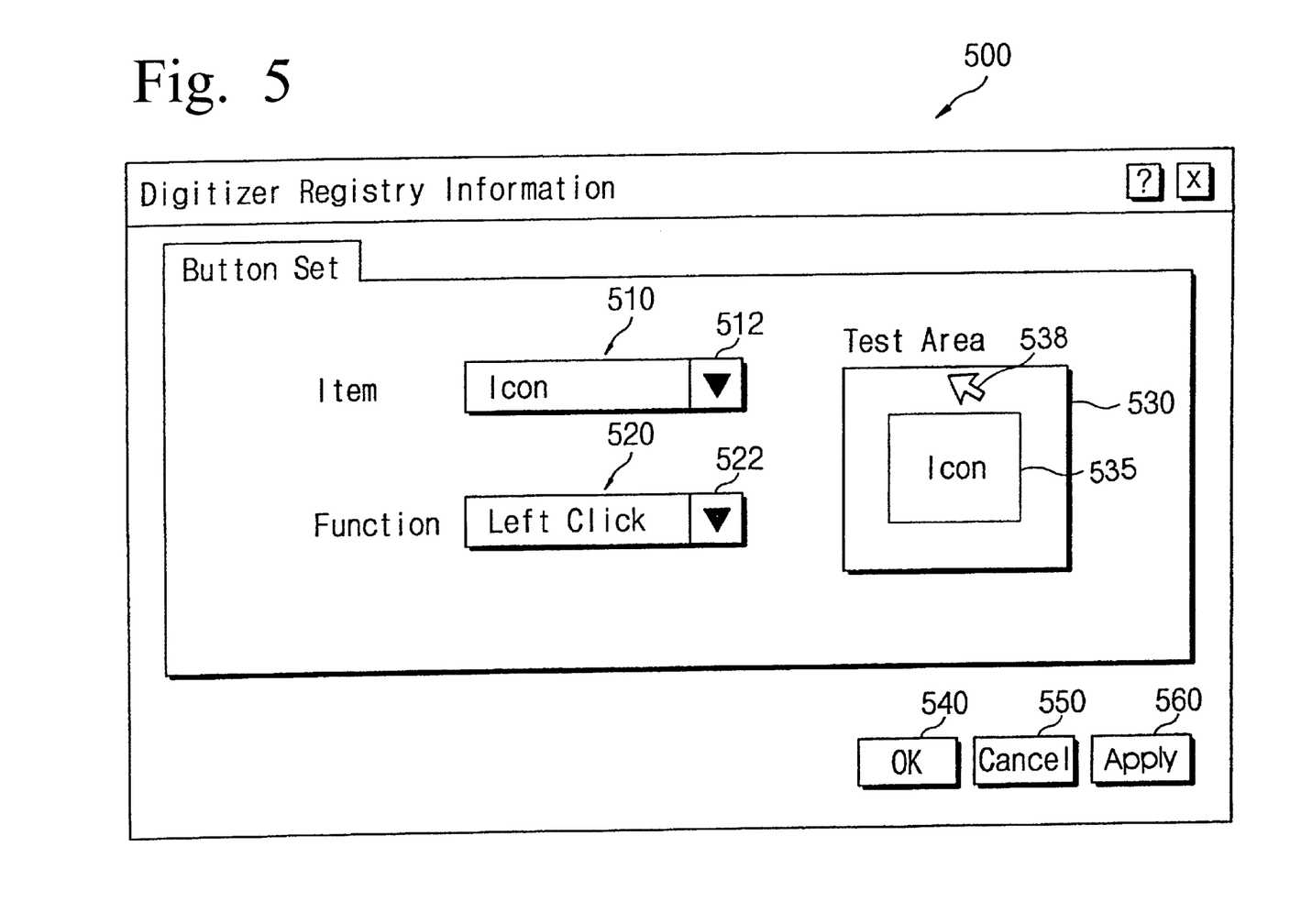
FIG. 5 is an exemplary drawing showing a program that a user is able to set up the moving direction and distance of a pointer, in order to perform the same function as a button click according to the present invention.

Continuing now with reference to FIG. 5, FIG. 5 illustrates a program that a user is able to set up the moving direction and distance of a pointer, in order to perform the same function as a button click or a pressing of a tip of the stylus, according to the present invention. Referring to FIG. 5, the screen 500 for setting the movement of the same pointer that corresponds to a user clicking a button or pressing a tip of a stylus includes an item area 510, a function area 520, and a setting area or test area 530. The icon, the menu bar, and the menu button are selected in the item area 510 and, if the user selects a pull-down menu bar 512, menus are displayed with a pulldown form. The same functions as a left or right button click, or a pressing of a tip of a stylus as corresponding to a button click function or other function, and left button double click are selected in the function area 520 and, if the user selects the pull-down menu bar 522, menus are displayed with a pull-down form. The user is therefore able to set up the movement of the pointer corresponding to marks of the item area 510 and the function area 520 in the setting area or test area 530 including a icon button 535 as a user interface area, for example. On pressing an OK button 540 or an apply button 560, it will be performed to start setting of the movement of the pointer 538 as the amount of the reference position change corresponding to the button click function according to the movement of the pointer 538 set in the test area or setting area 530.

According to the present invention, it is possible to perform the same corresponding button click functions by moving a pointer a specific direction over a predetermined distance without using a button of a pointing device. Thus, a user is able to more conveniently use the pointing device in a computer system. In this regard, the present invention is especially advantageous in that continuously changing a holding form while clicking the button of the stylus can be suppressed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for driving a pointing device of a computer system corresponding to movement of a pointer on a screen of a display device, comprising the steps of:

determining whether said pointer is positioned in a user interface area on said screen of said display device;

determining whether a position of said pointer is changed from a previous position in said user interface area, when said pointer is previously positioned in said user interface area;

detecting an amount of a position change of said pointer, when said position of said pointer is changed from said previous position in said user interface area;

determining whether said amount of said position change of said pointer corresponds to a button click of said pointing device, said button click performing a function in said computer system; and generating a same pointing signal as a signal that corresponds to said button click to perform said function in said computer system, when said amount of said position change of said pointer corresponds to said button click of said pointing device, said amount of said position change of said pointer, that corresponds to said button click to perform said function in said computer system, corresponding to a moving distance of said pointer and a direction of movement of said pointer, said moving distance of said pointer and said direction of movement of said pointer being determined in relation to an initial reference position, said initial reference position being inside of said user interface area on said screen of said display device.

2. The method of claim 1, further comprised of said pointing device including a tablet including a two-dimensional coordinate plane and a stylus, said stylus being operated on said tablet and indicating a position of said pointer.

3. The method of claim 2, further comprised of determining whether said amount of said position change of said pointer corresponds to a predetermined amount of a reference position change of said pointer that corresponds to said function in said computer system.

4. By A method for driving a pointing device of a computer system corresponding to movement of a pointer on a screen of a display device, comprising the steps of:

determining whether said pointer is positioned in a user interface area on said screen of said display device;

determining whether a position of said pointer is changed from a previous position in said user interface area, when said pointer is previously positioned in said user interface area;

detecting an amount of a position change of said pointer, when said position of said pointer is changed from said previous position in said user interface area;

determining whether said amount of said position change of said pointer corresponds to a function in said computer system initiated by said pointing device; and generating a same pointing signal as a signal that corresponds to said function in said computer system initiated by said pointing device to perform said function in said computer system, when said amount of said position change of said pointer corresponds to said function in said computer system initiated by said pointing device, said amount of said position change of said pointer, that corresponds to said function in said computer system initiated by said pointing device, corresponding to a moving distance of said pointer and a direction of movement of said pointer, said moving distance of said pointer and said direction of movement of said pointer being determined in relation to an initial reference position, said initial reference position being inside of said user interface area on said screen of said display device.

5. The method of claim 4, further comprised of said pointing device including a tablet including a two-dimensional coordinate plane and a stylus, said stylus being operated on said tablet and indicating a position of said pointer.

6. The method of claims 4, further comprised of determining whether said amount of said position change of said pointer corresponds to a predetermined amount of a reference position change of said pointer that corresponds to said function in said computer system initiated by said pointing device.

7. The method of claim 4, further comprised of said function in said computer system initiated by said pointing device includes one of a function in said computer system corresponding to a button click of said pointing device and a function in said computer system corresponding to pressing a tip of a stylus of said pointing device.

8. The method of claim 7, further comprised of said pointing device including a tablet including a two-dimensional coordinate plane and said stylus, said stylus being operated on said tablet and indicating a position of said pointer.

9. The method of claim 7, further comprised of determining whether said amount of said position change of said pointer corresponds to a predetermined amount of a reference position change of said pointer that corresponds to said function in said computer system initiated by said pointing device.

10. A method of setting a button click function of a pointing device to perform said button click function according to movement of a pointer in a computer system, comprising the steps of:

selecting a button as a selected button of said pointing device and a function corresponding to said selected button; and setting each specific direction and each amount of change in each said specific direction corresponding to said function of said selected button by moving said pointer starting from an initial reference position on a screen of a display device for said computer system, each said specific direction and each said amount of change in each said specific direction comprising an amount of a reference position change corresponding to said function of said selected button, each said specific direction and each said amount of change in each said specific direction being determined in relation to said initial reference position, said initial reference position being inside of a user interface area on said screen of said display device for said computer system.

11. A method of setting a button click function of a pointing device to perform said button click function according to movement of a pointer in a computer system, comprising the steps of:

selecting a button as a selected button of said pointing device and a function corresponding to said selected button; and setting within a test area on a screen of a display device for said computer system each specific direction and each amount of change in each said specific direction corresponding to said function of said selected button by moving said pointer starting from an initial reference position on said screen of said display device for said computer system, said initial reference position being within said test area.

12. A method of setting a function in a computer system initiated by a pointing device to perform said function according to movement of a pointer in said computer system, comprising the steps of:

selecting a function in said computer system initiated by said pointing device; and setting each specific direction and each amount of change in each said specific direction corresponding to said function in said computer system initiated by said pointing device by moving said pointer starting from an initial reference position on a screen of a display device for said computer system, each said specific direction and each said amount of change in each said specific direction comprising an amount of a reference position change corresponding to said function in said computer system initiated by said pointing device, each said specific direction and each said amount of change in each said specific direction being determined in relation to said initial reference position, said initial reference position being inside of a user interface area on said screen of said display device for said computer system.

13. A method of setting a function in a computer system initiated by a pointing device to perform said function according to movement of a pointer in said computer system, comprising the steps of:

selecting a function in said computer system initiated by said pointing device; and setting within a test area on a screen of a display device for said computer system each specific direction and each amount of change in each said specific direction corresponding to said function in said computer system initiated by said pointing device by moving said pointer starting from an initial reference position on said screen of said display device for said computer system, said initial reference position being within said test area.

14. The method of claim 13, further comprised of each said specific direction and each said amount of change in each said specific direction being determined in relation to said initial reference position, said initial reference position being inside of, a user interface area on said screen of said display device for said computer system.

15. The method of claim 12, further comprised of said function in said computer system initiated by said pointing device including one of a function in said computer system corresponding to a button click of said pointing device and a function in said computer system corresponding to pressing the tip of a stylus of said pointing device.

16. The method of claim 15, further comprised of setting within a test area on said screen of said display device for said computer system each said specific direction and each said amount of change in each said specific direction, said initial reference position being within said test area.

17. An apparatus for driving a pointing device of a computer system corresponding to movement of a pointer on a screen of a display device, comprising:

means for determining whether said pointer is positioned in a user interface area on said screen of said display device;

means for determining whether a position of said pointer is changed from a previous position in said user interface area, when said pointer is previously positioned in said user interface area;

means for detecting an amount of a position change of said pointer, when said position of said pointer is changed from said previous position in said user interface area;

means for determining whether said amount of said position change of said pointer corresponds to a function in said computer system initiated by said pointing device; and means for generating a same pointing signal as a signal that corresponds to said function in said computer system initiated by said pointing device to perform said function in said computer system, when said amount of said position change of said pointer corresponds to said function in said computer system initiated by said pointing device, said amount of said position change of said pointer, that corresponds to said function in said computer system initiated by said pointing device, corresponding to a moving distance of said pointer and a direction of movement of said pointer, said moving distance of said pointer and said direction of movement of said pointer being determined in relation to an initial reference position, said initial reference position being inside of said user interface area on said screen of said display device.

18. The apparatus of claim 17, further comprised of said pointing device including a tablet including a two-dimensional coordinate plane and a stylus, said stylus being operated on said tablet and indicating a position of said pointer.

19. The apparatus of claim 17, further comprised of said amount of said position change of said pointer corresponding to a predetermined amount of a reference position change of said pointer that corresponds to said function in said computer system initiated by said pointing device.

20. The apparatus of claim 17, further comprised of said function in said computer system initiated by said pointing device including one of a function in said computer system corresponding to a button click of said pointing device and a function in said computer system corresponding to pressing a tip of a stylus of said pointing device.

21. An apparatus for setting a function initiated by a pointing device to perform said function according to movement of a pointer in a computer system, comprising:

means for selecting a function in said computer system initiated by said pointing device;

means for moving a pointer on a screen of a display device for said computer system; and means for setting each specific direction and each amount of change in each said specific direction corresponding to said function in said computer system initiated by said pointing device resulting from movement of said pointer starting from an initial reference position on said screen of said display device for said computer system, each said specific direction and each said amount of change in each said specific direction comprising an amount of a reference position change corresponding to said function in said computer system initiated by said pointing device, each said specific direction and each said amount of change in each said specific direction being determined in relation to said initial reference position, said initial reference position being inside of a user interface area on said screen of said display device for said computer system.

22. The apparatus of claim 21, further comprised of said function in said computer system initiated by said pointing device including one of a function in said computer system corresponding to a button click of said pointing device and a function in said computer system corresponding to pressing a tip of a stylus of said pointing device.

23. An apparatus for setting a function initiated by a pointing device to perform said function according to movement of a pointer in a computer system, comprising:

means for selecting a function in said computer system initiated by said pointing device;

means for moving a pointer on a screen of a display device for said computer system; and     means for setting within a test area on said screen of said display device for said computer system each specific direction and each amount of change in each said specific direction corresponding to said function in said computer system initiated by said pointing device resulting from movement of said pointer starting from an initial reference position on said screen of said display device for said computer system, said initial reference position being within said test area.

* * * * *